United States Patent [19]

Shimaya

[11] Patent Number: 5,073,150
[45] Date of Patent: Dec. 17, 1991

[54] CHAIN TENSIONER

[75] Inventor: Kazuhiko Shimaya, Saitama, Japan

[73] Assignee: Tsubakimoto Chain Co., Osaka, Japan

[21] Appl. No.: 550,254

[22] Filed: Jul. 9, 1990

[30] Foreign Application Priority Data

Jul. 10, 1989 [JP] Japan .............................. 1-80048[U]

[51] Int. Cl.$^5$ .............................................. F16H 7/08
[52] U.S. Cl. .................................................. 474/110
[58] Field of Search ...................... 474/101, 109–111, 474/113–117, 133, 135, 136, 138

[56] References Cited

U.S. PATENT DOCUMENTS

| 4,458,403 | 7/1984 | Foster | 474/138 X |
| 4,822,320 | 4/1989 | Suzuki | 474/111 |
| 4,874,352 | 10/1989 | Suzuki | 474/110 |
| 4,881,927 | 11/1989 | Suzuki | 474/110 |
| 4,909,777 | 3/1990 | Inoue et al. | 474/110 |
| 4,911,679 | 3/1990 | Inoue et al. | 474/110 |

FOREIGN PATENT DOCUMENTS 56-49451  5/1981  Japan .

Primary Examiner—Thuy M. Bui
Attorney, Agent, or Firm—Howson & Howson

[57] ABSTRACT

A tensioner for an engine-driven chain applies a decreasing tensioning force to the chain as engine speed increases to suppress howling. The tensioning force is applied by a spring. The decrease in force is achieved by an expansible chamber in fluid communication with the engine lubrication system. As engine speed increases, lubricant pressure increases, causing the expansible chamber to apply a force to the tensioner which opposes the force tending to apply tension to the chain. In two embodiments described, a ratchet with backlash is used to prevent excessive slackening of the chain following sudden increases in chain tension. The backlash allows the lubricant pressure in the expansible chamber to decrease the force applied by the tensioner to the chain. In a third embodiment, a floating tensioner assembly, including a plunger, a floating housing, a spring and a ratchet, is urged as a whole against a second spring by hydraulic pressure applying a force to the plunger and an opposite force to a fixed housing.

8 Claims, 3 Drawing Sheets

CHAIN TENSIONER

BRIEF SUMMARY OF THE INVENTION

This invention relates to tensioners, and in particular to tensioners for imparting tension to power transmission chains, for example chains used in automobile engines to transmit power from the crankshaft to a camshaft.

In conventional tensioners, hydraulic pressure, spring force, or a combination thereof, is used to impart tension to the chain. In general, conventional tensioners impart tension to the chain at all times. As a result, as the speed of the chain increases, vibrations are set up in a section of the chain between a sprocket and the tensioner shoe which is held in contact with the chain. These vibrations often produce an objectionable howling sound.

According to one aspect of the invention there is provided a chain tensioner comprising a housing, a plunger slidable in the housing, spring means biasing the plunger in a protruding direction relative to the housing, means within the housing providing an expansible chamber for hydraulic fluid, and means responsive to the pressure of hydraulic fluid in the expansible chamber for applying a force to the plunger urging the plunger in a retracting direction opposite to the protruding direction.

The biasing force applied by the spring and urging the plunger in the protruding direction, and the force applied by the hydraulic fluid and urging the plunger in the retracting direction, are applied simultaneously.

In an automobile engine, for example, the tensioner may be used to apply tension to a chain which is driven by the engine crankshaft and used to transmit power to a camshaft. A tensioning shoe connected to the plunger of the tensioner is held by the plunger in contact with the chain. The engine lubricating oil pump is also driven by the crankshaft, and a connection is provided between the pump and the expansible chamber of the tensioner to provide fluid communication therebetween. When the engine is at idle or at rest, with little or no oil pressure, the spring urges the plunger in the protruding direction, causing the plunger and the tensioning shoe thereon to apply tension to the chain. As the speed of the engine increases, the driving speed of the chain also increases, and the chain enters a speed range in which the howling sound would ordinarily be generated. However, the oil pressure also increases with increasing engine speed. Consequently, and increased pressure is applied to the expansible chamber of the tensioner. This increased pressure reduces the force exerted by the tensioner on the chain as the speed of the chain increases, and thereby eliminates, or at least reduces the intensity of, the howling sound.

In one version of the tensioner in accordance with the invention, a ratchet mechanism, connected to the housing and to the plunger, is provided for limiting movement of the plunger in the retracting direction, while permitting a predetermined amount of backlash in the movement of the plunger whereby said plunger is able to retract to a limited extent following movement in the protruding direction. The backlash permitted by the ratchet mechanism allows the increase in engine oil pressure to effect the amount of slackening in the chain necessary to reduce or eliminate the howling sound which ordinarily accompanies an increase in engine speed. However, the ratchet also prevents excessive slackening of the chain which can occur following sudden increases in chain tension or upon operation of the engine at high speed.

In another version of the tensioner, the housing comprises a fixed part and a floating part. The spring means is arranged to apply opposite forces to the plunger and to the floating part of the housing, for urging the plunger in the protruding direction. The expansible chamber is arranged to apply opposite forces to the plunger and to the fixed part of the housing for urging the plunger in the retracting direction. A ratchet means limits retracting movement of the plunger relative to the floating part of the housing. A second spring is arranged to apply opposite forces to the fixed and floating parts of the housing for urging the floating part in the protruding direction. Consequently, an increase in the pressure of hydraulic fluid in the expansible chamber causes the plunger and the floating part of the housing to move in the retracting direction relative to the fixed part of the housing even while the ratchet prevents retracting movement of the plunger relative to the floating part of the housing.

While the second spring urges the floating part of the housing in the protruding direction, it does not impart tension to the chain because the extent of movement of the floating part is limited. The second spring is compressed, however, when excessive tension occurs in the chain, or when a sufficiently high hydraulic pressure is applied to the oil in the expansible chamber as the engine speed increases.

In the case of excessive chain tension, although the plunger is prevented from retracting by the ratchet, the force applied to the plunger as a result of excessive chain tension is transmitted to the second spring from the plunger through the ratchet, the first spring and the floating part of the housing. Consequently, retracting movement of the plunger is allowed by the second spring, and the excessive tension on the chain is relieved.

In the case of increased engine speed, the hydraulic pressure applied to the plunger may cause the plunger to retract by a certain amount, if permitted by the ratchet. Then the second spring is compressed. The force exerted on the plunger by the pressure of the oil in the expansible chamber is transmitted through the first spring, the ratchet, and the floating housing to the second spring. Since the tensioner assembly is urged in opposite directions by the second spring and by the hydraulic pressure in the expansible chamber, an appropriate degree of slackening of the chain can be set by adjusting the spring force of the second spring and the hydraulic pressure.

The principal object of this invention, therefore, is to provide a chain tensioner in which howling noise due to increased chain speed is reduced or eliminated by reducing chain tension as chain speed increases.

It is also an object of this invention to provide a chain tensioner, for reducing or eliminating howling noise, which is simple, inexpensive to manufacture and reliable.

It is also an object of the invention to provide a chain tensioner which reduces or eliminates howling noise and also eliminates excessive slackening of the chain.

Still other objects and advantages of the invention will be apparent from the following detailed description, when read in conjunction with the drawings.

DETAILED DESCRIPTION

Figure 1:
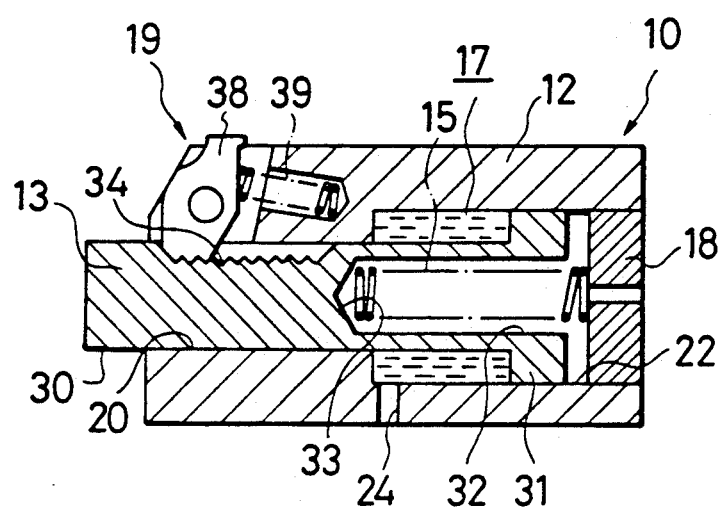
FIG. 1 is a an axial section of a tensioner in accordance with a first embodiment of the invention.

Tensioner 10, constructed in accordance with the first embodiment of the invention, as shown in FIG. 1, comprises a housing 12 having a generally cylindrical plunger 13, a coil spring 15 arranged to urge the plunger in a protruding direction, and an expansible chamber 17 arranged to urge the plunger in the retracting direction.

Figure 4:
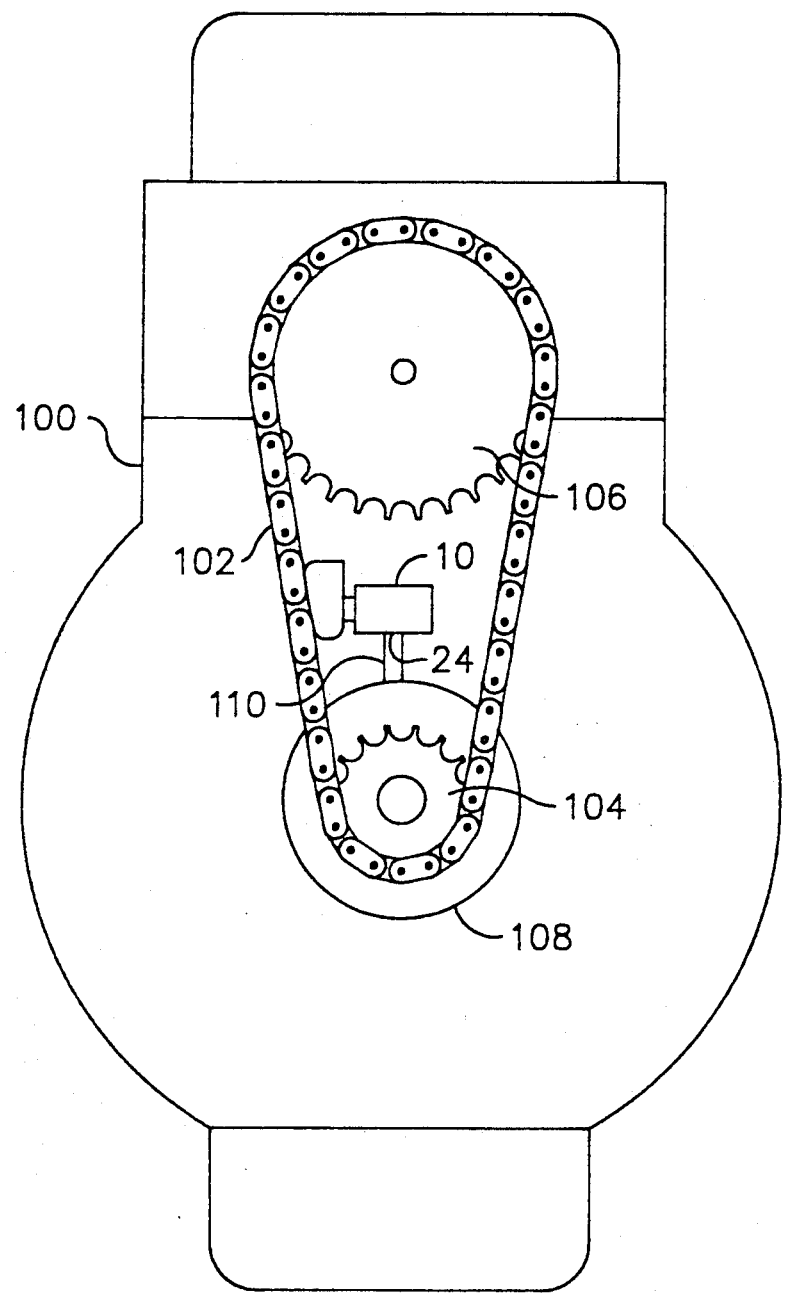
FIG. 4 is a schematic elevational view showing the tensioner in combination with a timing chain on an automobile engine.

The housing is constructed with internal cylindrical bores 20 and 22 arranged in series on a common axis, bore 22 having a larger diameter than bore 20. External surface 30 of plunger 13 conforms closely to bore 20 so that bore 20 functions to guide the plunger and to seal expansible chamber 17. Flange 31 at one end of the plunger conforms to, and is guided by bore 22. The wall of bore 22, the external surface 30 of plunger 13, and flange 31 form expansible chamber 17. Oil or other hydraulic fluid is admitted to and exhausted from chamber 17 through passage 24. Referring to FIG. 4 in 100. In a typical engine 100 pass chain 102 is connected between a crankshaft sprocket 104 and a camshaft sprocket 106, and is maintained in tension by tensioner 10. Passage 24 of the tensioner is connected to the engine lubrication system, which includes an engine-driven oil pump 108, through a conduit 110. When the engine is a rest, the oil in chamber 17 is at atmospheric pressure. However, when the engine is started, the pressure of the oil in chamber 17 corresponds to the engine oil pressure, and increases with increasing engine R.P.M.

A plug 18 is press-fit into bore 22, and one end of coil spring 15 bears against plug 18, while the other end extends into a cylindrical bore 32 in plunger 13 and bears against end 33 of bore 32, thereby urging the plunger in the protruding direction.

A ratchet mechanism 19 allows protruding movement of the plunger, but limits retracting movement.

When the engine is at rest or just started, the hydraulic pressure within expansible chamber 17 is low. Plunger 13, being urged by spring 15 against the chain, prevents the chain from rattling immediately after the engine is started.

As the engine speed increases and the tension of the chain increases, increased hydraulic pressure is applied to expansible chamber 17, thereby imparting a retracting force to the plunger, counteracting the protruding force applied by spring 15. There are three forces acting on the plunger: the spring force, which acts in the protruding direction; and the chain tension, which acts in the retracting direction; and the force resulting from hydraulic pressure in chamber 17, which also acts in the retracting direction. Within the range of engine R.P.M. in which a howling sound is likely to occur, the occurrence of the sound is suppressed by the slackening imparted to the chain by the hydraulic pressure in chamber 17 acting to urge plunger 13 in the retracting direction.

The hydraulic pressure within chamber 17 varies with engine speed and depends on the characteristics of the particular engine with which the chain tensioner is used. The retracting force applied to the plunger as a result of the hydraulic pressure within chamber 17 depends not only on the magnitude of the pressure, but on the area of flange 31 to which pressure is applied. Thus, the retracting force depends on the outer diameter of external plunger surface 30 as well as the diameter of flange 31.

Ratchet mechanism 19 comprises a rack 34 formed in a longitudinal groove on surface 30 of plunger 13, and a pawl 38 which is rotatably supported on a pin in housing 12 and biased counterclockwise and into engagement with the rack by spring 39. The principal purpose of the ratchet mechanism is to prevent plunger 13 from retreating excessively when a high degree of tension accidentally occurs in the chain. The ratchet mechanism is desirably constructed in accordance with U.S. Pat. No. 4,822,320, issued Apr. 18, 1989, in which provision is made for a positive backlash immediately after advancement of a rack in a protruding direction. The entire disclosure of U.S. Pat. No. 4,822,320 is here incorporated by reference.

Ratchet mechanism 19 also allows plunger 13 to retreat by a predetermined amount when a retracting force is applied to the plunger by reason of an increase in hydraulic pressure within expansible chamber 17. The ratchet mechanism limits the retraction of the plunger by preventing the plunger from retracting beyond that predetermined amount.

As will be apparent from the foregoing discussion, tensioner 10, having a ratchet mechanism 19, mitigates excessive tension in a chain, imparts an appropriate tension to the chain, allows the chain to slacken then the speed of the chain increases, and limits the retracting movement of the plunger due to hydraulic pressure.

Figure 2:
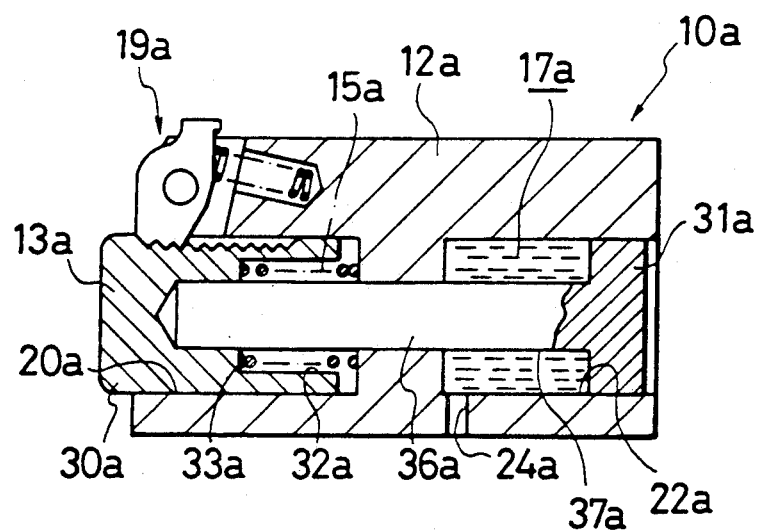
FIG. 2 is a an axial section of a tensioner in accordance with a second embodiment of the invention.

Referring now to FIG. 2, a tensioner 10a comprises a housing 12a, a plunger 13a, a spring 15a urging the plunger in the protruding direction, and an expansible chamber 17a arranged to urge the plunger in the retracting direction.

Housing 12a has a first bore 20a at one end, a second similar bore 22a at the opposite end. These two bores are coaxial and are connected by smaller diameter passage which closely fits a connecting rod 36a which extends through the smaller diameter passage from bore 20a to bore 22a.

A plunger 13a, fixed to one end of connecting rod 36a, is slidably guided in bore 20a. A flanged portion 31a, formed at the opposite end of connecting rod 36a, is slidably guided in bore 22a. Expansible chamber 17a is formed by the cylindrical interior surface of bore 22a, the outer surface 37a of connecting rod 36a, and flanged portion 31a.

Spring 15a is situated in a bore 32a in plunger 13a and is held between surface 33a within the plunger, and the wall within the housing which separates bores 20a and 22a.

The function of the tensioner of FIG. 2 is similar to that of the tensioner of FIG. 1. However, the tensioner of FIG. 2 has the advantage that its overall length can be made shorter than that of the tensioner in FIG. 1.

Figure 3:
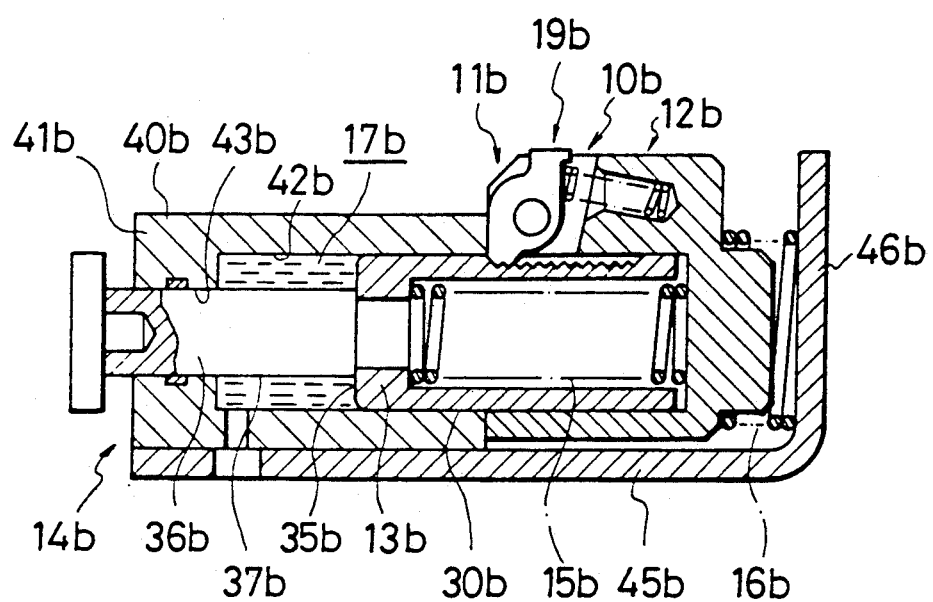
FIG. 3 is a an axial section of a tensioner of the floating housing type, in accordance with a third embodiment of the invention.

FIG. 3 shows a tensioner 10b, which comprises a floating tensioner assembly 11b supported in a fixed housing 14b for axial movement, i.e. along the left-right direction as viewed in FIG. 3. A coil spring 16b urges tensioner assembly 11b toward the left, i.e. in the protruding direction.

The floating tensioner assembly 11b comprises a floating housing 12b having a cylindrical plunger 13b received and slidable in an axial bore of the floating housing. A coil spring 15b is arranged to urge plunger 13b in the protruding direction, and a ratchet mechanism 19b prevents the plunger from retreating relative to floating housing 12b. A rod 36b is press fit into one end of plunger 13b.

The fixed housing 14b includes a holder 40b and a bracket 45b. The holder 40b is in the form of a hollow cylinder having a bottom 41b. The inner surface 42b of the holder 40b conforms to the outer cylindrical surface 30b of the portion of plunger 13b which extends from the floating housing 12b. Rod 36b extends slidably through an axial opening 43b in bottom 41b of the holder, with its outer cylindrical surface 37b in slidable sealing contact with the inner surface of opening 43b. The tensioner assembly 11b is therefore guided by the sliding engagement of rod 36b and opening 43b. Rod 36b extends from holder 40b to abut against a tensioner shoe (not shown).

An expansible chamber 17b is formed by front surface 35b of the plunger, outer cylindrical surface 37b of rod 36b, and bottom 41b of holder 40b. Hydraulic pressure within chamber 17b is exerted against the front surface 35b of the plunger to urge the tensioner assembly 11b in the retracting direction. Bracket 45b is L-shaped and is fixed to holder 40b. Tensioner assembly 11b is held between holder 40b and upwardly extending portion 46b of the bracket, but is able to float axially.

Spring 16b bears against portion 46b of the bracket, and urges the tensioner assembly 11b in the protruding direction. Protruding movement of the tensioner assembly is limited, however, by engagement of the tensioner assembly with the holder 40b. The spring constant of spring 15b is set lower than that of spring 16b so that spring 15b applies tension to the chain through the plunger and rod 36b while the tensioner assembly is held by spring 16b at its forward limit against holder 40b.

In operation, the tensioner assembly 11b is initially held at its forward limit against holder 40b by spring 16b.

While the engine is at rest and immediately after the engine is started, the hydraulic pressure in chamber 17b is low and the plunger 13b and rod 36b impart tension to the chain under the urging of spring 15b to suppress rattling of the chain.

As the speed of the engine increases, chain tension also tends to increase. However, the hydraulic pressure in chamber 17b increases and plunger 13b is urged in the retracting direction. Ratchet mechanism 19b prevents plunger 13b from retracting relative to the floating housing 12b, but the retracting force due to chain tension or to hydraulic pressure within chamber 17b is applied to spring 16b through plunger 13b, the ratchet mechanism 19b and the floating housing 12b. Consequently, spring 16b is compressed and tensioner assembly 11b retracts. Howling is suppressed as a result of slackening of the chain when its speed increases.

The extent of retraction due to hydraulic pressure is not limited by the ratchet mechanism. Consequently the floating tensioner assembly 11b can retract more and more as hydraulic pressure increases. The extent of retraction of the tensioner assembly depends upon the magnitude of the pressure within chamber 17b, the pressure- receiving area, and the spring constant of spring 16b, i.e. the difference between the free length of the spring and its fully compressed length. Thus in the embodiment of FIG. 3, the extent to which the tensioner assembly 11b retracts can be set by modifying any of a number of variables.

The tensioners in accordance with this invention can ba modified in numerous respects, for example by the use of different forms of springs and ratchets and different plunger and expansible chamber configurations. These and other modifications which will occur to persons skilled in the art may be made without departing from the scope of the invention as defined in the following claims.

I claim:

1. A chain tensioner comprising: a tensioner assembly having a floating housing, a plunger received in said housing in the protruding direction, a first spring arranged between said floating housing and said plunger so as to impart a protruding force to said plunger and a ratchet mechanism for preventing said plunger from retreating; a second spring for urging said assembly in the protruding direction; and a fixed housing formed with an oil chamber in cooperation with said plunger so as to apply an external hydraulic pressure on said plunger in the direction opposite to said protruding direction; whereby the amount of protrusion of said floating housing by means of the second spring is limited.

2. A chain tensioner comprising a housing, a plunger slidable in said housing, spring means biasing said plunger in a protruding direction relative to said housing, means within said housing providing an expansible chamber for hydraulic fluid, means, connectible between said expansible chamber and an engine lubrication system, for placing the hydraulic fluid in said expansible chamber in pressure communication with said engine lubrication system, whereby the pressure in said expansible chamber increases as the pressure of said engine lubrication system increases, and means responsive to the pressure of hydraulic fluid in said expansible chamber for applying, to said plunger, a force, directly proportional to said pressure of hydraulic fluid in said expansible chamber, said force urging the plunger in a retracting direction opposite to said protruding direction.

3. A chain tensioner according to claim 2 including ratchet means, connected to said housing and to said plunger, for limiting movement of the plunger in said retracting direction, said ratchet means permitting a predetermined amount of backlash in the movement of said plunger whereby said plunger is able to retract to a limited extent following movement of the plunger in the protruding direction.

4. A chain tensioner comprising a housing, a plunger slidable in said housing, spring means biasing said plunger in a protruding direction relative to said housing, means within said housing providing an expansible chamber for hydraulic fluid, and means responsive to the pressure of hydraulic fluid in said expansible chamber for applying a force to said plunger urging the plunger in a retracting direction opposite to said protruding direction, in combination with an engine, a power transmitting chain driven by said engine, a tensioning shoe connected to said plunger and held by said plunger in contact with said chain, hydraulic fluid pumping means also driven by said engine and applying increased pressure to hydraulic fluid pumped thereby as the speed of the engine increases, and means providing hydraulic fluid communication between said pumping means and said expansible chamber whereby said force urging said plunger in a retracting direction increases as the speed of the engine increases.

5. A chain tensioner according to claim 4 including ratchet means, connected to said housing and to said plunger, for limiting movement of the plunger in said retracting direction, said ratchet means permitting a predetermined amount of backlash in the movement of said plunger whereby said plunger is able to retract to a limited extent following movement of the plunger in the protruding direction.

6. A chain tensioner comprising a housing, a plunger slidable in said housing, spring means biasing said plunger in a protruding direction relative to said housing, means within said housing providing an expansible chamber for hydraulic fluid, and means responsive to the pressure of hydraulic fluid in said expansible chamber for applying a force to said plunger urging the plunger in a retracting direction opposite to said protruding direction, in which the housing comprises a fixed part and a floating part; in which said spring means is arranged to applying opposite forces to said plunger and to said floating part, for urging said plunger in said protruding direction; in which the expansible chamber is arranged to apply opposite forces to said plunger and to said fixed part of the housing for urging said plunger in said retracting direction; including ratchet means for limiting retracting movement of the plunger relative to said floating part; and including second spring means arranged to apply opposite forces to said fixed and floating parts for urging said floating part in said protruding direction; whereby an increase in the pressure of hydraulic fluid in said expansible chamber causes said plunger and said floating part of the housing to move in the retracting direction relative to said fixed part of the housing.

7. A chain tensioner according to claim 6 including stop means for limiting movement of the floating part of the housing in the protruding direction relative to said fixed part of the housing.

8. A chain tensioner according to claim 6 in combination with an engine, a power transmitting chain driven by said engine, a tensioning shoe connected to said plunger and held by said plunger in contact with said chain, hydraulic fluid pumping means also driven by said engine and applying increased pressure to hydraulic fluid pumped thereby as the speed of the engine increases, and means providing hydraulic fluid communication between said pumping means and said expansible chamber.

* * * * *